March 27, 1951  H. I. BECKER  2,546,715
GAS ANALYZER DETECTING DEVICE
Filed May 17, 1950
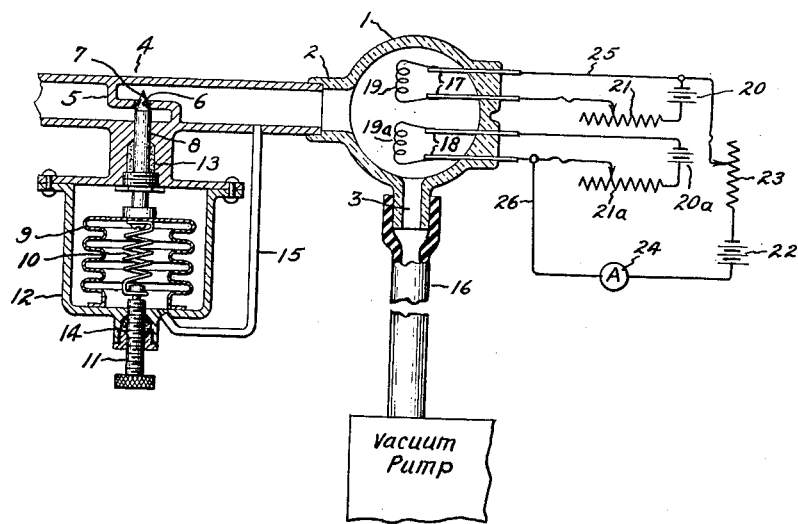
Inventor:
Howard I. Becker,
by  *Caude H. Mott*
His Attorney.

Patented Mar. 27, 1951

2,546,715

UNITED STATES PATENT OFFICE 2,546,715

GAS ANALYZER DETECTING DEVICE

Howard I. Becker, Rexford, N. Y., assignor to General Electric Company, a corporation of New York Application May 17, 1950, Serial No. 162,563

2 Claims. (Cl. 175—183)

This invention relates to a detecting device and, in particular, to a gas analyzer of the glow discharge type having the purpose of detecting a change in an otherwise stable atmospheric condition.

There are many examples of the desirability of being able to detect a change in atmospheric conditions. For instance, it is worthwhile to know when a gasoline leak occurs during the flight of an airplane. Particularly, a leak in the vicinity of the engines or in the fuel storage tanks in the wings. If these gasoline leaks can be detected at an early stage before a dangerous concentration of gasoline or gas fumes builds up, it is possible to eliminate a grave disaster in a plane. Another example of a use of a detecting device would be in a mine underground where gas of noxious variety having potentialities of killing a number of men might possibly escape from an uncovered vein.

While the principle of operation of a gas glow discharge tube is old in the art, and while the use of such a tube for the detection of changes in atmospheric conditions is old, there has long been a need in the art for an automatic device that will continuously analyze a stable atmospheric condition for the detection of a change therein.

It is an object of this invention to provide a device for continuously analyzing a gaseous atmosphere to determine whether or not a change occurs in the otherwise stable atmosphere.

It is a further object of this invention to provide an automatic device for continuously analyzing atmospheric conditions.

It is a still further object of this invention to provide an improved analyzing device that is inexpensive and simple in operation.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

Briefly, this invention comprises use of a tube having a pair of electrodes therein and a vacuum producing device which maintains pressure within the tube at a predetermined level. An electron flow is produced within the tube and any change in atmospheric conditions is indicated by a glow between the electrodes and by a change in the current flowing between them.

Referring to the drawing, the single figure is a schematic indication of the operation of the elements of this invention.

In the drawing, a glass tube or shell 1 is shown provided with an inlet 2 and an outlet 3. The inlet and the outlet are sealed to the glass tube to prevent any leakage at the joints. The purpose of inlet 2 is to admit gases from the atmosphere to the glass tube 1. A valve 4 is installed in inlet 2 and serves the purpose of maintaining the pressure within glass tube 1 at a constant level. Valve 4 functions as follows. An obstruction 5, having a port 6, is placed transverse to the axis of inlet 2 to obstruct the passage of gas through the port 6. A needle 7, mounted on a stem 8, is employed to change the area of port 6 and thus allow a greater or lesser amount of gas to pass through the port. Stem 8 is actuated by a bellows 9 acting in opposition to a spring 10, the tension of which is regulated by set screw 11. Bellows 9 is positioned within a housing 12 that is maintained at a constant pressure to establish a base operating pressure against which to calibrate the operation of this instrument. Sealing gaskets 13 and 14 are positioned at the upper and lower ends of housing 12 to insure the maintaining of the predetermined pressure within housing 12. Bellows 9 is connected by a conduit 15 to either the glass tube 1 or to some point in the inlet 2 which reflects the pressure within glass tube 1. With this structure, bellows 9 is responsive to the pressure within tube 1 and actuates rod 8 and needle 7 to change the area of port 6. Consequently, the flow of gas from the atmosphere into tube 1 is varied, depending upon the pressure within glass tube 1 by means of valve 4. This, in turn, maintains constant the pressure within tube 1.

Outlet 3 from glass tube 1 is a conduit that connects the tube to an inlet 16 of a vacuum producing device. The vacuum device can be a vacuum pump driven by a motor or it can be a water aspirator, and, in certain circumstances, it has been found that a Venturi tube will produce a sufficiently low pressure to accomplish the desired results. It is intended that the vacuum producing means provide no limitation on the scope of this invention, but merely that some device capable of producing a vacuum within glass tube 1 is employed at the end of conduit outlet 3 to produce satisfactory vacuum within glass tube 1. By satisfactory vacuum it is meant about two to three centimeters of mercury absolute. It is to be pointed out, however, that this satisfactory vacuum of 2 to 3 centimeters of mercury is not intended to be a limitation insofar as the practicality of this device is not limited to that particular vacuum. What is meant is that satisfactory operating conditions have been achieved with a pressure of from 2 to 3 centimeters of mercury maintained within the tube. This pressure is not by any means critical because tests have been performed satisfactorily at much lower pressures, even down to the maintaining of a pressure of a few microns.

A pair of electrodes 17 and 18 are also sealed in glass tube 1. In a preferred embodiment, each of the electrodes as shown in the drawing comprises a pair of rods extending through the wall of the glass tube with the rods of both pairs 17 and 18 being joined by coiled filaments 19 and 19a respectively. These filaments are preferably of the type used in electric light bulbs. It is to be understood that it is not necessary that this type of filament be used, since it has been noted in tests that the use of straight electrodes made of platinum or the like produces the same results as the coiled filaments 19.

The filaments 17 and 18 are shown connected to sources of voltage 20 and 20a, which send a heating current through the filament. The amount of current is regulated by variable resistors 21 and 21a, connected in the circuits of filaments 19 and 19a, respectively. Consequently, it is possible to heat one of the filaments to a higher temperature than the other by merely regulating the variable resistors 21 and 21a. It is to be pointed out at this time that while the use of a heating circuit and a heating source such as that shown at 20 has been found to increase the sensitivity of the operation of this instrument, that the instrument also functions satisfactorily when the electrodes are at the same temperature as the bulb and when no external voltage source is used.

A plate voltage supply 22 is connected through variable resistor 23 and an ammeter 24 to the two electrodes. One side 25 of the source 22 is connected to electrode 17, while the other side 26 of source 22 is connected to electrode 18. It is to be noted that at any one instant the positive side is connected to one electrode, while the negative side of plate supply 22 is connected to the other electrode. Consequently, a potential drop exists across the two electrodes. Variable resistor 23 is employed to change the plate voltage or the potential across electrodes 17 and 18, while ammeter 24 is employed to read the current that passes in that circuit.

Apparently, electrons will not flow from one filament to the other at a noticeable rate at atmospheric pressure; however, an electron flow does take place across the electrodes when the tube is evacuated. The electron flow is inversely proportional to the pressure in tube 1 until a critical pressure is reached, whereupon a decrease in pressure will not increase the electron flow. This electron flow is recorded by ammeter 24. By adjusting the variable resistor 23, the amount of current at any fixed pressure within tube 1 is regulated and a reading is given on ammeter 24.

In accordance with the principles of this invention, if, while the tube is maintained at a pressure of from 2 to 3 centimeters of mercury, a small quantity of gas which changes the contents of a stable atmosphere is introduced into tube 1, a glow is produced between electrodes 17 and 18. By glow is meant that an ionization of the gas takes place which produces an actual illumination of the gas that is introduced into the tube. This glow, in turn, causes a higher or lower current to flow in the circuit; the current, in turn, is recorded in ammeter 24. By higher or lower current flow is meant that some of the gases, such as the halogen gases, cause decrease in the current, while other gases of the hydrocarbon variety cause an increase in the current. For this reason, depending upon the type gas to be detected, the ammeter needle is set either at a high or low point on the scale of ammeter 24.

In the operation of this invention, then, vacuum source 16 is used to maintain a constant pressure in tube 1 through the aid of valve 4 which varies the size of opening of port 6 in the obstruction 5 in inlet 2. A supply of atmosphere flows in through inlet 2 to tube 1, because of the reduced pressure therein. This atmosphere passes around electrodes 17 and 18 and out through the vacuum source. So long as atmosphere being measured remains of a constant chemical consistency, the ammeter 24 records a steady reading. As soon as some extraneous gas is introduced through port 6 and inlet 2 into tube 1, then a glow takes place across electrodes 17 and 18 and an immediate change is noted in ammeter 24. The needle deflects and remains in its deflected position as long as the extraneous matter is within the gases in tube 1. As soon as this extraneous matter has been removed, the needle returns to its original setting.

While the operation of this invention has been correlated with the movement of an ammeter needle across a scale, it is to be realized that this is not meant to be a limitation on the scope of this invention, but rather the deflection of an ammeter needle is merely to more clearly illustrate the operating principle. In place of the ammeter, any kind of an alarm or bell system or signal can be used and amplified to do any one of a number of things, such as opening doors or escape hatches to eliminate the impurity that is being detected.

Referring now to electrodes 17 and 18, it has been found that electrodes made of platinum perform very satisfactorily and are of advantage and worthy of use because of the fact that the properties of platinum keep the electrodes from deteriorating through the glow discharge; specifically, it has been found that the use of platinum permits the use of this invention for a prolonged period of time without replacement of the electrodes.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. A gas analyzing device comprising a globular-like shell defining a central air space, an inlet conduit connected to said shell to provide for the admission of gases, a throttle valve in said inlet conduit, means including a bellows responsive to pressure within said shell for varying the opening of said valve to maintain a constant pressure within said tube, an outlet conduit from said shell, a vacuum producing means connected to said outlet to evacuate said shell and maintain it at a pressure less than 3 centimeters of mercury absolute, a pair of electrodes positioned within said shell, a plate supply circuit comprising a variable resistor and a signaling device joining said electrodes, said signaling device operable in response to the electron flow between said electrodes, said variable resistor providing means to regulate the electron flow across said electrodes for a stable atmospheric condition, said signaling device indicating an increased or a decreased current flow in said plate supply circuit when a change takes place in the composition of the gas flowing through said shell.

2. In a device for continuously analyzing a flow of gas to detect a chemical change therein, a globular-like shell defining a central air space, an inlet conduit connected to said tube to admit thereto a continuous supply of the atmosphere to be analyzed, a throttle valve in said inlet conduit comprising a flow obstructing partition defining a port for the admission of the atmosphere to be tested to said shell, a bellows and a needle actuated thereby to vary the area of said port to regulate the flow of atmosphere to be analyzed, a conduit connecting said bellows to said shell, said bellows operating in response to the pressure within said shell to vary the area of said port to maintain constant the pressure within said shell, an outlet conduit connected to said shell, means connected to said outlet for evacuating said shell and to draw a continuous supply of atmosphere therethrough, a pair of electrodes positioned in said shell, means for electrically heating each of said electrodes, a plate power supply comprising a power source, a variable resistor, and a device responsive to a change in current flow in said power source, said power source connected across said electrodes to produce an electron flow across them when said shell is evacuated to a pressure below 3 centimeters of mercury absolute, said variable resistor regulating the electron flow across said electrodes for a stable atmospheric condition, said current change responsive device operating in response to the introduction of a changed atmospheric condition into said shell which varies the electron flow across said electrodes.

HOWARD I. BECKER.

REFERENCES CITED

The following references are of record in the file of this patent:

UNITED STATES PATENTS

| Number | Name | Date |
| --- | --- | --- |
| 1,377,282 | Schafer | May 10, 1921 |
| 1,421,720 | Roberts | July 4, 1922 |
| 1,697,339 | Baker | Jan. 1, 1929 |
| 1,871,226 | Skala | Aug. 9, 1932 |
| 2,393,650 | Metcalf | Jan. 29, 1946 |